United States Patent
Lem et al.

(10) Patent No.: US 8,678,500 B2
(45) Date of Patent: Mar. 25, 2014

(54) SEAT, IN PARTICULAR A VEHICLE SEAT, HAVING A DEFORMATION ELEMENT, AND METHOD FOR ACTIVATING A DEFORMATION ELEMENT OF A SEAT

(75) Inventors: Jeroen Lem, Maastricht (NL); Karl Michael Siebertz, Aldenhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 13/369,346

(22) Filed: Feb. 9, 2012

(65) Prior Publication Data
US 2012/0223554 A1 Sep. 6, 2012

(30) Foreign Application Priority Data
Mar. 2, 2011 (DE) .................. 10 2011 004 974

(51) Int. Cl.
*A47C 7/14* (2006.01)
*A47C 4/54* (2006.01)
(52) U.S. Cl.
USPC .................. 297/284.6; 297/452.41
(58) Field of Classification Search
USPC ........................... 297/284.6, 452.41
See application file for complete search history.

(56) References Cited

U.S. PATENT DOCUMENTS

| | | | | |
|---|---|---|---|---|
| 4,655,505 A * | 4/1987 | Kashiwamura et al. | ... | 297/284.6 |
| 5,127,708 A * | 7/1992 | Kishi et al. | ............. | 297/284.6 X |
| 5,129,704 A * | 7/1992 | Kishi et al. | ............. | 297/284.6 X |
| 5,283,735 A * | 2/1994 | Gross et al. | ............. | 297/284.1 X |
| 5,320,409 A * | 6/1994 | Katoh et al. | ................ | 297/284.6 |
| 5,558,398 A * | 9/1996 | Santos | .................... | 297/284.6 X |
| 6,203,105 B1 * | 3/2001 | Rhodes, Jr. | ................ | 297/284.6 |
| 6,220,667 B1 * | 4/2001 | Wagner | .................... | 297/284.6 X |
| 6,560,803 B2 * | 5/2003 | Zur | ........................ | 297/284.6 X |
| 6,873,892 B2 * | 3/2005 | Katz et al. | ....................... | 701/49 |
| 7,113,100 B2 * | 9/2006 | Yoshinori et al. | ...... | 297/284.6 X |
| 7,156,467 B2 * | 1/2007 | Kimmig | ................. | 297/284.6 X |
| 7,322,651 B2 * | 1/2008 | Makhsous et al. | ......... | 297/284.6 |
| 8,181,292 B1 * | 5/2012 | Pellettiere | ......................... | 5/654 |
| 8,251,447 B2 * | 8/2012 | Fujita et al. | ................ | 297/284.6 |
| 2002/0079726 A1 * | 6/2002 | Garber et al. | ............. | 297/284.6 |
| 2010/0117412 A1 * | 5/2010 | Bicker | .................... | 297/284.6 X |

FOREIGN PATENT DOCUMENTS

EP          1564066 A1    8/2005

* cited by examiner

*Primary Examiner* — Rodney B White
(74) *Attorney, Agent, or Firm* — Shook Hardy & Bacon LLP

(57) ABSTRACT

A seat according to the invention, in particular a vehicle seat (25), comprises a seat frame (29), a seat surface (31) and at least one deformation element acting between the seat frame (29) and the seat surface (31), at least the one deformation element being capable of automatic activation in order to compensate actively for vibrations transmitted via the seat frame (29) to a person sitting on the seat. The invention also relates to a method for activating a deformation element of a seat, in particular a vehicle seat (25), which acts between a seat frame (29) and a seat surface (31) of the seat.

11 Claims, 4 Drawing Sheets

SEAT, IN PARTICULAR A VEHICLE SEAT, HAVING A DEFORMATION ELEMENT, AND METHOD FOR ACTIVATING A DEFORMATION ELEMENT OF A SEAT

The invention relates to a seat, in particular a vehicle seat, having a deformation element, and a method for activating a deformation element of a seat, according to the preamble of the independent claims.

A number of requirements are laid down with regard to the design of vehicle seats. For example, a vehicle seat should, in particular, afford a vehicle occupant comfortable seating free from fatigue. For this purpose it is necessary to damp the vibrations, which are transmitted from a vehicle via the seat to a person sitting on the seat. Vehicle seats therefore usually comprise a sprung support of the seat face and/or a foam cushion for damping vibrations. Here, a sprung support of the seat face, for example by means of resilient metal wires, is capable of largely preventing the transmission of high-frequency vibrations to the sitting person; at the same time, however, low-frequency resonant vibrations in the range from approximately 4 to 7 Hz can occur, which adversely affect the seating comfort. Conversely a foam overlay on a base firmly connected to the seat frame achieves a good isolation at low frequencies, but the damping of higher-frequency vibrations is inferior.

EP 1 564 066 B1 therefore proposes a seat having at least one deformation element, a rigid support plate being arranged between the deformation element and the seat overlay. In order to obtain an improved damping behavior or a reduced transmission capacity in as many driving situations as possible and with a widely varying occupant anatomy, the deformation elements can be automatically adjusted via a control, the control device taking account of the physiological parameters and vehicle, driving situation and/or seat parameters. In this way the damping characteristics can be adjusted to the driving situation and/or the occupant whilst underway. According to EP 1 712 405 B1 at least two deformation elements are provided, which allow a tilting movement, so as to also prevent fatigue.

An object of the present invention is to create a seat, in particular a vehicle seat, having a deformation element, which has a further improved damping behavior in respect of vibrations transmitted to a sitting person. A further object of the present invention is to specify a method for activating a deformation element of a seat, which affords a further improvement in vibration damping.

This object is achieved by a device and by a method as specified in the independent claims.

A seat according to the invention, in particular a vehicle seat, comprises a seat frame and a seat surface. The seat frame represents a support structure of the seat, which, for example, comprises an outer frame and a sheet-metal pan, which is firmly connected to the former and on which further elements of the seat construction rest. In the case of a vehicle seat, the seat frame is connected to the vehicle by way of a slide and/or adjusting mechanism, for example. The seat surface provides the contact between the seat and a person sitting on the seat, and in particular comprises a seat face and a surface of a backrest of the seat. The seat surface may be formed by the surface of a seat overlay, which among other things comprises a seat cushion. The seat surface, seat overlay, seat cushion and backrest may be of single or multi piece design.

The seat further comprises at least one deformation element, which acts between the seat frame and the seat surface. For this purpose the deformation element is arranged in such a way that it absorbs at least a proportion of the forces which are exerted on the seat by the sitting person, in particular weight and inertial forces, and transmits them into the support structure of the seat, that is to say into the seat frame. Conversely the deformation element exerts corresponding forces on the person. The deformation element may be arranged beneath the seat surface or beneath a seat cushion, but it may also be embodied as a seat cushion, for example, and may itself form the seat surface or a part of the seat surface.

At least the one deformation element can be automatically activated, in particular via a control, for adjusting its shape and/or volume. An adjustment of the shape and/or volume of the deformation element controlled in this way therefore leads to an adjustment of the shape of the seat surface and/or an adjustment of the forces, which are transmitted via this to the sitting person. The deformation element may be actuated in various ways, for example pneumatically, hydraulically, via electric servomotors, shape memory elements or other means.

According to the invention at least the one deformation element is activated in order to compensate actively for vibrations, which may be transmitted via the seat frame to a person sitting on the seat. In a vehicle seat such vibrations are caused in particular by irregularities of the road surface during the travelling motion of the vehicle and are transmitted via the chassis to the vehicle, from whence they are transmitted to the seat frame connected to the vehicle. However, such vibrations may also be generated, for example, by the engine itself or by a starter and by other moving parts of the vehicle, possibly by a wheel imbalance, and transmitted to the seat frame. Acceleration or braking movements of the vehicle can likewise give rise to such vibrations.

Since at least the one deformation element is activated in order to compensate actively for such vibrations, an active balancing of vibratory movements and therefore a partial or virtually complete neutralizing of the vibratory movements is possible. Only a slight proportion of the vibrations, if any, is now therefore transmitted to the person sitting on the seat. The invention therefore recognizes that through a corresponding activation of the deformation element it is possible actively to eliminate the vibrations transmitted to the person by the seat frame. A considerable gain in comfort is thereby obtained.

At least the one deformation element may be arranged in various areas of the seat structure and embodied in various ways. Thus, for example, a deformation element may be arranged inside or beneath a seat cushion or the seat overlay or even beneath a support plate beneath the seat cushion. A deformation element may also be arranged in the backrest. Multiple deformation elements may also be provided in a seat, either in the same area or in different areas of the seat.

At least the one deformation element is preferably embodied as a seat cushion. This affords a direct contact with a person sitting on the seat and allows an especially effective control for maximum possible compensation of the vibrations.

According to a preferred embodiment of the invention at least the one deformation element comprises a fluid-filled cushion. In particular, the deformation element may be embodied as such a cushion, for example as a seat cushion, which is filled with a liquid or a gas. This affords an especially simple, inexpensive and effect design of the deformation element.

It is furthermore preferred that the deformation element be activatable by a fluid control unit, which controls the pressure and/or the volume of the fluid contained in the cushion. This is a simple way of embodying a control according to the invention.

The fluid control unit may advantageously be integrated into the seat, that is to say in particular arranged inside the seat or firmly connected to the latter, for example beneath the seat face or in the backrest. This firstly has the advantage that a connecting line between the fluid control unit and the fluid-filled cushion needs to have only a relatively short length, thereby allowing a more rapid and effective control of the pressure and/or of the volume of the fluid contained in the cushion. Secondly, such an arrangement facilitates the servicing and also, for example, the replacement of a seat including the fluid control unit in the event of a defect.

According to a preferred embodiment of the invention the fluid control unit comprises a motor-driven, in particular an electric motor-driven fluid cylinder, which is fluid-connected via a connecting line to the fluid-filled cushion. A movement of the piston of the fluid cylinder serves to adjust the volume of fluid contained in the cylinder, causing the pressure and/or the volume of the fluid contained in the connecting line and in the cushion to adjust accordingly. Correspondingly, a motor-driven diaphragm can also be used. This is an easy and direct way of deforming the fluid-filled cushion, so that vibrations can be compensated for over wide frequency range.

According to a further preferred embodiment the fluid control unit comprises a fluid reservoir, pressurizable to a sufficient excess pressure, and a valve arrangement for activating a fluid feed inlet to and a fluid discharge outlet from the cushion. The valve arrangement may comprise, for example, an activatable feed valve and an activatable discharge valve or even, for example, an activatable multiway valve, by means of which a connecting line to the cushion can be connected either to a feed inlet or to a discharge outlet. The fluid reservoir may be filled continuously or at intervals by a motor-driven pump. The valve or valves of the valve arrangement is/are advantageously embodied as electrically activatable valves, for example as solenoid valves. The cushion can be filled with fluid and drained again through an actuation of the valves. For a small outlay this embodiment allows the compensation of vibrations, at least in a limited frequency range.

The fluid control unit may comprise a plurality of fluid cylinders or fluid reservoirs and valves, making it possible to activate one cushion or a plurality of cushions. A control of the motor of the fluid cylinder or the valves may be contained in the fluid control unit or it may be embodied as a separate control, in particular as an electronic control.

According to a preferred embodiment the fluid is a gas. This exploits the advantage that a gas-filled cushion has advantageous damping characteristics merely due to the compressibility of the gas. It is particularly advantageous if the gas used is air. Air is universally available and can be compressed by simple means to form compressed air and used for activating the cushion.

It is further preferred that the deformation element be activatable on the basis of a signal from a pressure sensor, which is arranged for measuring a pressure of the fluid contained in the cushion. Since the exertion of an increased force on the person sitting on the seat is associated with an increased pressure of the fluid, such a pressure senor allows an accurate measurement of the force which, for example, is exerted on the person when the vibration movement is transmitted. A dynamic registering of the pressure is particularly advantageous, for example with sensors having a resolution up to frequencies of approximately 50 to 100 Hz. Through a corresponding, pressure-controlled actuation of a fluid cylinder or a valve, for example, fluid can be discharged from the cushion in order to counteract a measured variation in pressure. This is a simple way of preventing a transmission of vibrations to the person.

According to a further preferred embodiment the deformation element is activatable on the basis of a signal from an acceleration sensor arranged for measuring an acceleration of the vehicle and of the seat frame. In particular, an acceleration sensor arranged on the seat frame is suited to registering the vibrations to be compensated for in accordance with the invention. Such registering therefore occurs already prior to a possible transmission to the person sitting on the seat. A corresponding acceleration-controlled actuation of a fluid cylinder, say, or of a valve can serve to counteract the measured vibration acceleration. The vibrations can thereby be largely compensated for and transmission to the person can be avoided.

Since a vehicle seat is generally rigidly connected to the vehicle and the most intrusive vibrations lie in the frequency range below 20 Hz, the registering of the vibrations of the vehicle itself are often sufficient to activate the deformation element in order to compensate actively for the vibrations. This has the advantage that acceleration sensors often already provided in motor vehicles in connection with other systems such as ESP or airbag can be used. In this case the acceleration value in a vertical direction is particularly relevant for activation of the deformation element.

More preferably, it is possible to provide at least one pressure sensor for registering a pressure of the fluid contained in the cushion and at least one acceleration sensor for registering an acceleration of the vehicle or of the seat frame, the two signals from which are evaluated and used for activating at least the one deformation element. In this way it is possible to prevent almost entirely any transmission of the vibrations of the seat frame to the sitting person.

In addition to the active compensation for vibrations according to the invention, at least the one deformation element can also be used for an adjustable, passive damping and for a massage function, as described in the printed patent specification EP 1 564 066 B1 and in the printed patent specification EP 1 712 405 B1, which are incorporated by reference into the present application.

In a method according to the invention for activating a deformation element of a seat, in particular a vehicle seat, which acts between a seat frame and a seat surface of the seat, the deformation element is activated in order to compensate actively for vibrations, which are transmitted via the seat frame to a person sitting on the seat. Such an active balancing of the vibrations makes it possible largely to prevent any transmission to the person, thereby obtaining a considerable gain in comfort.

A deformation element, which comprises a fluid-filled cushion, is preferably activated in such a way that a pressure of the fluid contained in the cushion corresponds to a static pressure. The static pressure is that pressure which is needed for balancing the force statically exerted by the sitting person on the corresponding area of the seat and thereby on the deformation element, in particular for balancing the weight exerted by the person. The pressure of the fluid contained in the cushion is preferably controlled by actuation of a fluid cylinder or a valve, say, in such a way that the pressure is at least approximately constant and is therefore equal to the static pressure. For this purpose it is possible, in particular, to measure the pressure and in the event of a deviation from a constant pressure value it is possible to trigger an actuation of the fluid cylinder or a valve, in order to counteract the deviation. Alternatively or in addition, it is also possible, for example, to register the signal from an acceleration sensor of the vehicle and to evaluate this for actuation of the fluid cylinder or the valve.

An electronic control device, which according to the inventive method is designed to activate a fluid control unit, for example a fluid cylinder or a valve arrangement, may form a part of the fluid control unit and may be assigned to the seat, for example. However, the control device may also be embodied as part of a central electronic control device of a vehicle.

By way of example, the invention is explained in more detail below with reference to the drawings, of which:

Figure 1:
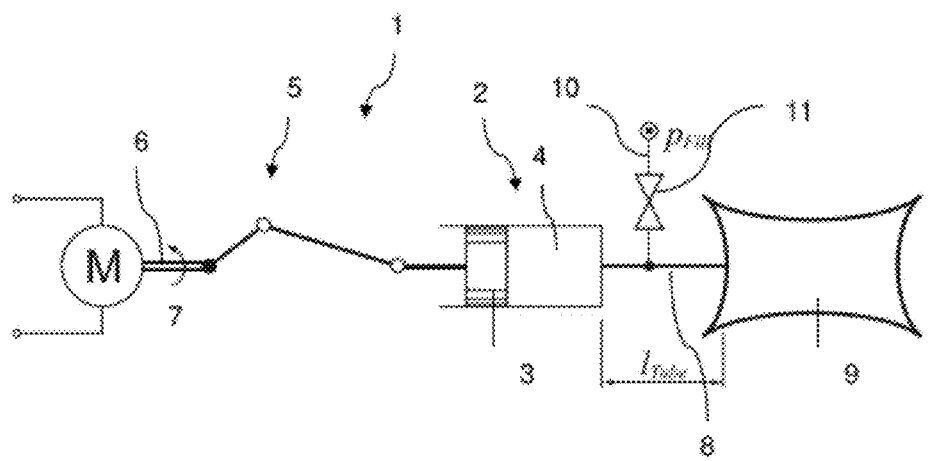
FIG. 1 shows a schematic representation of a fluid control unit and a fluid-filled cushion according to a first exemplary embodiment of a seat according to the invention.

As represented in FIG. 1, a fluid control unit 1 according to one exemplary embodiment of the invention may be embodied as a pneumatic control unit having a pneumatic cylinder 2. As actuator, a piston 3, the position of which serves for adjusting the volume of the fluid, in this case air, present in the cylinder chamber 4, can be moveably arranged in the pneumatic cylinder 2. The piston 3 is driven by an electric motor M via a lever linkage 5. Represented symbolically here is a lever 6, which is driven by the motor M and which, for example, is capable of swiveling in the direction of the arrow 7.

The pneumatic cylinder 2 is connected via a connecting line 8, for example a pneumatic hose, to a deformation element of a seat, which in FIG. 1 is represented schematically as a cushion 9. The sub-system comprising the cylinder chamber 4, connecting line 8 and the cushion 9 can be filled with compressed air of a predefined filling pressure $p_{Fill}$ via a connection line 10, which can be closed by a shutoff valve 11.

Through actuation of the motor M it is possible to adjust the volume of the air present in the cylinder chamber 4. If, for example, the piston 3 is moved to the right in the representation in FIG. 1, the air is displaced from the cylinder chamber 4 and the cushion 9 is accordingly more densely filled. If the cushion is not subjected to any load, the volume of the cushion 9 increases correspondingly, so that the shape of the cushion 9 or a seat surface of a seat, which contains such a cushion 9, is also adjusted. If the cushion 9 is subjected to a load or is designed in such a way that with denser filling it spontaneously builds up an increased counter-pressure, the volume of the cushion 9 increases slightly; in addition an increased pressure build up in the sub-system comprising the cylinder chamber 4, the connecting line 8 and the cushion 9. Conversely, movement of the piston 3 to the left serves to reduce the volume or the pressure inside the cushion 9. The volume and pressure of the cushion 9 produce corresponding adjustments and thereby movements of the seat surface. Unwanted vibration movements of the seat can therefore be compensated for by corresponding counterbalancing movements of the seat surface.

Through actuation of the motor M it is therefore possible actively to adjust the shape and/or the volume of the cushion 9 and/or the pressure prevailing therein. Whilst the maximum amplitude of the volume and pressure changes is predetermined by the range of movement of the piston 3, the piston can in principle be moved with any speed or frequency. It is thereby possible, in principle, to initiate, that is to say control volume and pressure changes of the cushion 9 of any speed. Here it is advantageous if the length $l_{Tube}$ of the connecting line 8 is short enough to allow a transmission of the movement of the piston 3 to the cushion 9 which is sufficiently rapid to compensate for the vibrations. It is likewise advantageous if the volume of the connecting line 8 is substantially less than that of the cushion 9, so that the movement of the piston 3 is translated into a sufficient pressure change inside the cushion 9. The arrangement represented in FIG. 1 is suited to generating volume and pressure changes inside the cushion 9 and therefore to compensating for vibrations with frequencies of up to at least approximately 20 Hz.

Figure 2:
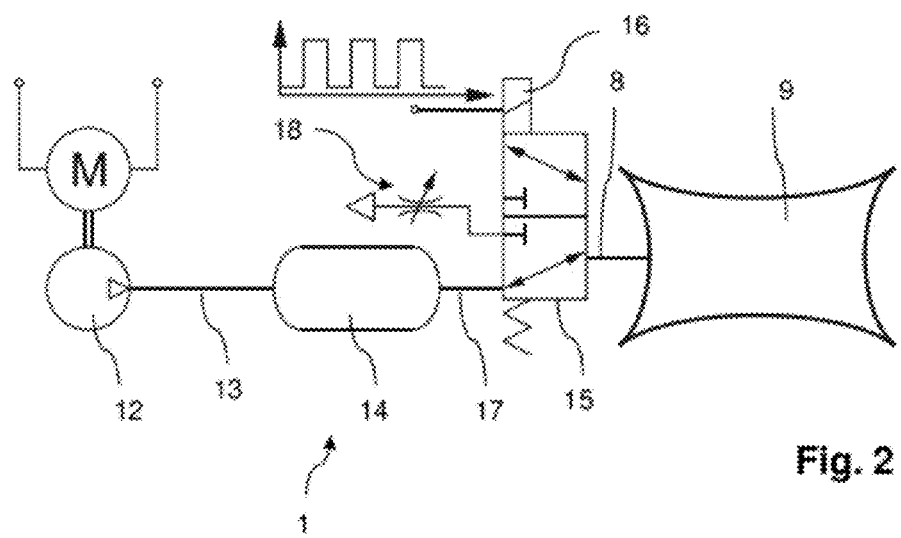
FIG. 2 shows a schematic representation of a fluid control unit and a fluid-filled cushion according to a second exemplary embodiment of a seat according to the invention.

FIG. 2 schematically represents an alternative arrangement of a pneumatic fluid control unit 1. According to FIG. 2 a pneumatic pump 12, driven by an electric motor M, is provided, which fills a compressed air reservoir 14 via a line 13. Also provided is a multiway valve 15, which, as indicated symbolically in FIG. 2, can be electrically actuated via an actuator 16. The multiway valve 15 is on the one hand connected by way of the connecting line 8 to the air-filled cushion 9. On the other hand the multiway valve 15 serves for connecting the connecting line 8 either to the compressed air reservoir 14 via a line 17, so that the cushion 9 is filled with compressed air, or to an adjustable restriction valve 18, so that the air can be discharged from the cushion 9.

As is symbolically represented, besides the electrically actuated actuator, as a graph of an actuating voltage over time in FIG. 2, the multiway valve 15, for example, can be switched at a constant, but in principle freely selectable frequency alternately between its two positions, in order to produce corresponding volume and pressure changes inside the cushion 9. Here the amplitude of the controlled pressure fluctuations can be predetermined by the pressure prevailing inside the compressed air reservoir 14 and by the adjustable restriction valve 18. The arrangement shown in FIG. 2 comprises only simple pneumatic components and is therefore particularly robust and inexpensive.

Figure 3:
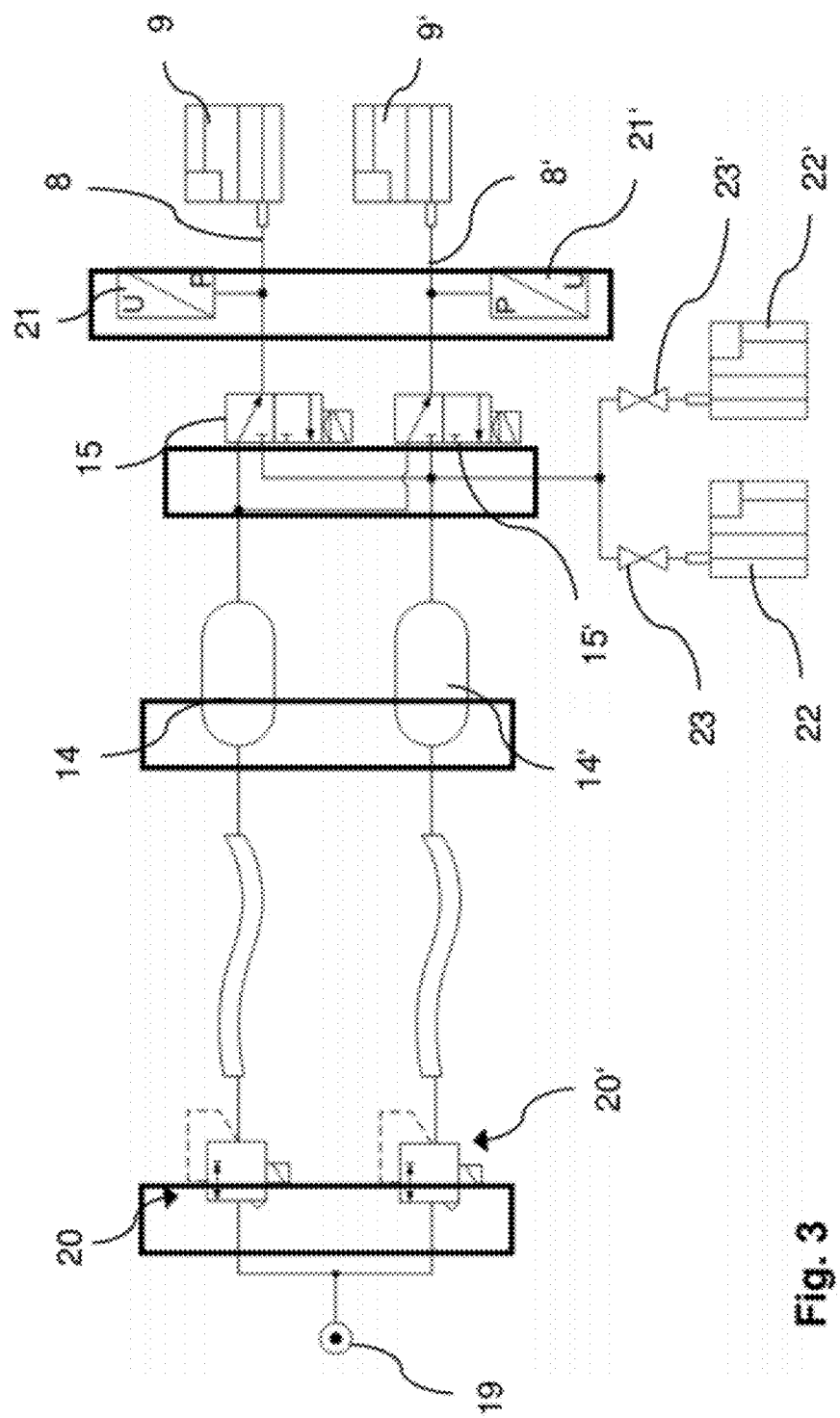
FIG. 3 shows a symbolic representation of a fluid control unit for activating a plurality of fluid-filled cushions according to a further exemplary embodiment of a seat according to the invention.

A fluid control unit can also be designed to activate a plurality of fluid-filled cushions 9, 9', as is shown by way of example in the symbolic representation in FIG. 3. Two compressed air reservoirs 14, 14' are supplied with compressed air via a compressed air connection 19 and via two pressure control valves 20, 20' and via corresponding lines (no reference numerals). Here the pressure control valves 20, 20' for the two compressed air reservoirs 14, 14' can be set to different pressures. The two compressed air reservoirs 14, 14' are connected to two multiway valves 15, 15', actuation of the multiway valves 15, 15' serving to connect either one or the other of the two compressed air reservoirs 14, 14' to a respective cushion 9, 9'. Pressure sensors 21, 21' for measuring the pressure inside the connecting lines 8, 8' and therefore inside the cushions 9, 9' are arranged on the connecting lines 8, 8' between the multiway valves 15, 15' and the cushions 9, 9'.

Actuation of the multiway valves 15, 15' serves for switching the pressure inside the cushions 9, 9' between the pressures of the two compressed air reservoirs 14, 14'. A corresponding change in the volume or pressure of the cushions 9, 9' can thereby be achieved. The multiway valves 15, 15' are in particular embodied as rapid-switching valves, so as to be able to activate the cushions 9, 9' with a frequency corresponding to the frequency of the vibrations to be damped, for example in the range from 4 to 8 Hz, in particular in the range from 4 to 5 Hz. Accordingly the pressure sensors 21, 21' are also embodied as dynamic pressure sensors for rapid pressure measurement.

As is indicated in FIG. 3, the pressure control valves 20, 20', the compressed air reservoirs 14, 14', the multiway valves 15, 15' and the pressure sensors 21, 21' may each be combined to form one standard mechanical unit. It is furthermore symbolically indicated in FIG. 3 that a seat may comprise further air-filled cushions 22, 22', which can be filled to a constant pressure from one compressed air reservoir 14' and each closed by a shutoff valve 23, 23'.

Figure 4:
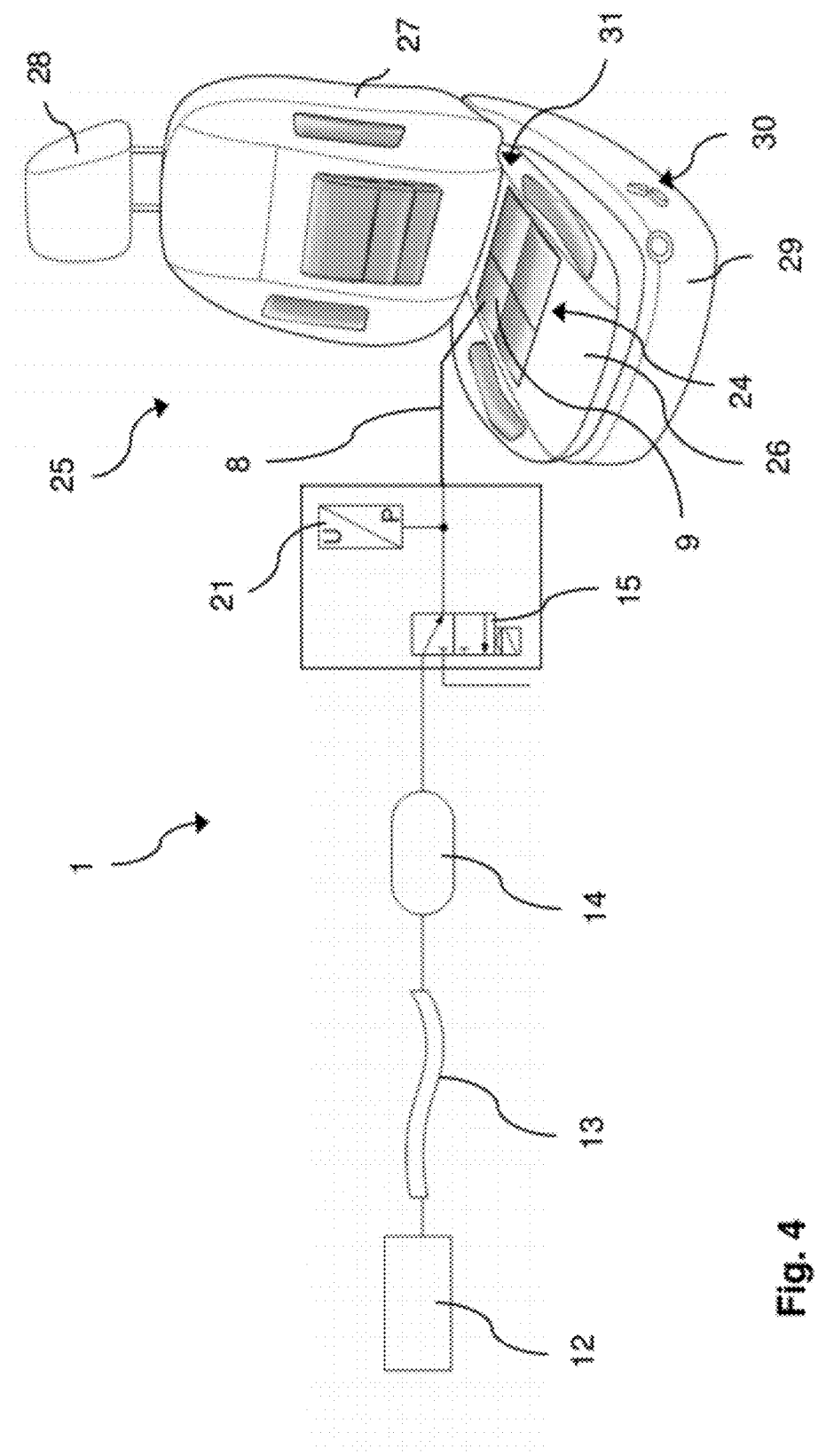
FIG. 4 shows a symbolic representation of a fluid control unit and an exemplary embodiment of a seat according to the invention.

FIG. 4 shows a further exemplary embodiment of a fluid control unit 1, which is designed for activating a seat cushion 24 of a vehicle seat 25. The fluid control unit 1 comprises a pneumatic pump 12, which is connected via a line 13 to a compressed air reservoir 14. A multiway valve 15 allows an air-filled cushion 9 either to be connected via a connecting line 8 to the compressed air reservoir 14 or to be vented by way of restriction valve (not shown). Arranged on the connecting line is a pressure sensor 21, which together with the multiway valve 15 may form a standard unit. The seat cushion 24 of the vehicle seat 15 comprises four air-filled cushions 9, which can be activated together or independently of one another.

The vehicle seat 25 comprises a seat face 26, a backrest 27 and a head rest 28. Operating control elements 30 are arranged on a part of the seat frame 29. The contact with a person sitting on the vehicle seat 25 is provided by way of the seat surface 31, which in particular is formed by the surface of the seat cushion 24 and other areas of the seat face 26 and the backrest 27, which are in contact with the person when seated. The vehicle seat 25 can thus be constructed as described in printed patent specification EP 1 564 066 B1 or in printed patent specification EP 1 712 405 B1, which also in this respect are incorporated by reference into the present application. In particular the seat face 26 may comprises a structure, which rests on an underside sheet-metal pan, which is part of the seat frame 29. Thus the cushions 9 may be supported on a foam block, for example, which rests on the sheet-metal pan. Additional support plates may furthermore be provided. The fluid control unit 1 may be arranged, for example, beneath the seat, possibly between the seat rails, or in the backrest 27.

When a person is sitting on the vehicle seat 25, the major part of the weight of the person is transmitted via the cushions 9 and the underlying seat structure to the seat frame 29. In the static state, that is to say in the absence of any vibrations, the pressure in the cushions 9 is the pressure needed to absorb the weight of the person. If the seat frame 29 connected to the vehicle now begins to perform an upward movement due to a vibration movement of the vehicle, for example, the pressure in the cushions 9 increases, since the sitting person at first cannot yet copy this movement owing to the mass inertia and the cushions 9 are therefore compressed; only due to the increased pressure are the cushions 9 able to generate the additional force needed to accelerate the person upwards in opposition to the inertial force. The increased pressure due to the compression of the cushions 9 is detected by the pressure sensor 21. An electronic control (not shown) thereupon shifts the multiway valve 15 into that position (not shown in FIG. 4), in which the cushions 9 are vented by way of an adjustable restriction valve. The pressure in the cushions 9 thereby falls, so that the person does not experience an increased force directed in a vertical direction. The vibration movement performed by the seat frame 29 is therefore not transmitted to the person sitting on the seat. Through a corresponding reciprocating switching of the valve 15, the cushions 9 can be activated in such a way that the vibration movement of the seat frame 29 is balanced out by an opposing change in the volume and shape of the seat cushion 24.

Figure 5:
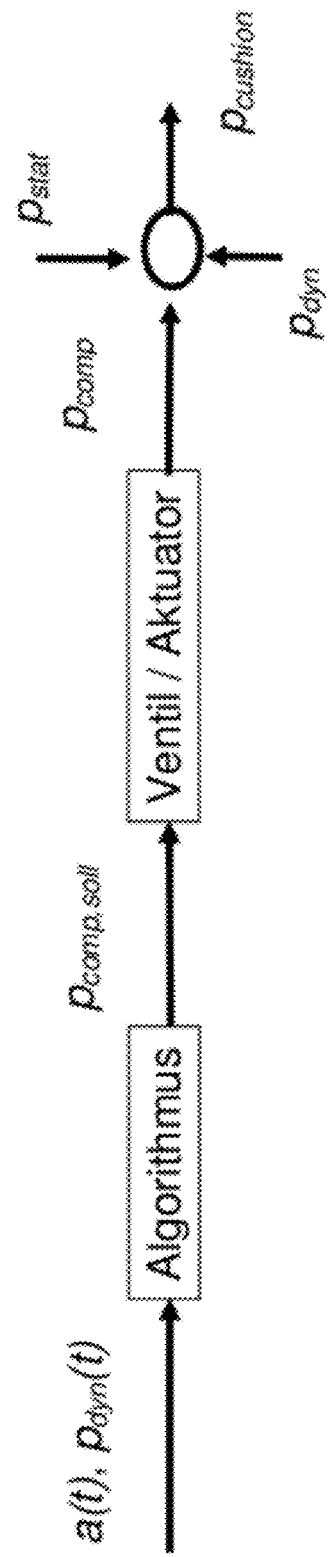
FIG. 5 shows a control method for controlling a fluid pressure in a fluid-filled cushion according to an exemplary embodiment of the invention.

A control method for activating the valves or a pneumatic cylinder is represented as a simplified block diagram in FIG. 5. An acceleration a(t), which in particular includes a vibration acceleration of the vehicle, is registered, for example by an acceleration sensor arranged on the seat rails. A dynamic pressure sensor furthermore registers the actual pressure $p_{cushion}(t)$ of the air in the air-filled cushion of the deformation element, which is generated by the weight exerted on the cushion by the sitting person and by dynamic forces. Since the static pressure $p_{stat}$, which is generated by the weight, is known and can be determined, for example, by averaging over time, the actual dynamic pressure $p_{dyn}(t)$ is obtained from the actual pressure $p_{cushion}(t)$ measured at the time t as:

$$p_{dyn}(t) = p_{cushion}(t) - p_{stat}$$

From this, an algorithm is used to determine a set-point value $p_{comp,set}$ of the compensation pressure. The algorithm takes account of a correlation of the vibration-induced fluctuations of the pressure value with the vibration-induced fluctuations of the force exerted on the sitting person. Since the pressure fluctuations are generally somewhat delayed in relation to the vibration-induced accelerations, an additional enhancement in terms of an anticipatory control is achieved by taking into account the measured value a(t) picked up by the acceleration sensor. The multiway valve or the pneumatic cylinder is activated on the basis of the set-point value $p_{comp,set}$ obtained, so that the cushion is subjected to an additional compensation pressure $p_{comp}$ and the quantity of air contained in the cushion is varied, in order to balance out the dynamic pressure $p_{dyn}(t)$. The pressure $p_{cushion}$, which is thereupon established in the cushion, is obtained from $$p_{cushion} = p_{stat} + p_{dyn} + p_{comp}$$

The aim, in particular, is to achieve:

$$p_{dyn} = -p_{comp}$$

In the context of a closed-loop control system this condition can be at least approximately fulfilled even under dynamic conditions. If the condition is completely fulfilled, the pressure in the cushion is equal to the static pressure, so that the vibrations introduced are completely eliminated and the sitting person is isolated almost completely from the vibrations of the seat frame. Even if this condition is fulfilled only approximately, it is possible to achieve extensive compensation of the vibrations.

LIST OF REFERENCE NUMERALS

M electric motor
1 fluid control unit
2 pneumatic cylinder
3 piston
4 cylinder chamber
5 lever linkage
6 lever
7 arrow
8 connecting line
9, 9' cushion
10 connection line
11 shutoff valve
12 pneumatic pump
13 line
14, 14' compressed air reservoir
15 multiway valve
16 actuator
17 line
18 restriction valve 19 compressed air connection
20 pressure control valves
21, 21' pressure sensor
22, 22' cushion
23, 23' shutoff valve
24 seat cushion
25 vehicle seat
26 seat face
27 backrest
28 head rest
29 seat frame
30 operating control elements
31 seat surface

The invention claimed is:

1. A vehicle seat (25) comprising:
   a seat frame (29);
   a seat surface (31);
   at least one deformation element including a fluid-filled cushion and being in communication with the seat frame (29) and the seat surface (31);
   a fluid control unit in communication with the at least one deformation element, the fluid control unit including at least one of a motor-driven fluid cylinder and a pressurized fluid reservoir; and
   at least one of a pressure sensor and an acceleration sensor in communication with the at least one deformation element, wherein the fluid control unit effects a change of fluid pressure within the fluid filled cushion upon receipt of an input from the at least one sensor,
   wherein the fluid control unit further includes a control algorithm, which is $P_{dyn}(t)=P_{cushion}(t)-P_{stat}$, $P_{stat}$ being a static pressure inside of the fluid-filled cushion, $P_{cushion}(t)$ being a pressure inside of the fluid-filled cushion at time t and measurable by the pressure sensor, $P_{dyn}(t)$ being a pressure inside of the fluid-filled cushion attributable to a change in motion detected by the acceleration sensor.

2. The vehicle seat of claim 1, wherein the at least one deformation element is a seat cushion (24).

3. The vehicle seat of claim 1, wherein the fluid control unit is responsive to a condition of the fluid-filled cushion, the condition being selected from the group consisting of the pressure of the fluid contained in the cushion (9, 9') and/or the volume of the fluid contained in the cushion (9, 9').

4. The vehicle seat of claim 1, wherein the fluid control unit further includes a connecting line (8) connecting the motor-driven fluid cylinder to the fluid-filled cushion (9, 9').

5. The vehicle seat of claim 1, wherein the fluid control unit further includes a valve arrangement for activating a fluid feed inlet to and a fluid discharge outlet from the fluid-filled cushion (9, 9').

6. The vehicle seat of claim 1, wherein the fluid is a gas.

7. A method for activating a deformation element of a vehicle seat (25), the deformation element including a fluid-filled cushion which is in communication with a seat frame (29) and a seat surface (31) of the seat, the vehicle seat further including a fluid control unit in communication with the at least one deformation element, the fluid control unit including at least one of a motor-driven fluid cylinder and a pressurized fluid reservoir, the vehicle seat further including at least one of a pressure sensor and an acceleration sensor in communication with the deformation element, the method comprising:
   adjusting fluid level within the fluid-filled cushion in response to an input from at least one of the pressure sensor and the acceleration sensor; such that the deformation element is activated in order to compensate actively for vibrations transmitted by way of the seat frame (29) to a person sitting on the seat, wherein the fluid control unit further includes a control algorithm, which is $P_{dyn}(t)=P_{cushion}(t)-P_{stat}$, $P_{stat}$ being a static pressure inside of the fluid-filled cushion, $P_{cushion}(t)$ being a pressure inside of the fluid-filled cushion at time t and measurable by the pressure sensor, $P_{dyn}(t)$ being a pressure inside of the fluid-filled cushion attributable to a change in motion detected by the acceleration sensor.

8. The vehicle seat of claim 1, wherein the pressure sensor is a dynamic sensor with a resolution up to frequencies of 50 to 100 Hz.

9. The vehicle seat of claim 1, wherein the acceleration sensor is positioned on the seat frame.

10. The vehicle seat of claim 1, wherein the fluid control unit is configured to effect a fluid delivery into or out of the fluid-filled cushion based at least in part of $P_{dyn}(t)$.

11. A vehicle seat comprising:
    a fluid-filled cushion;
    a pressure sensor and an acceleration sensor communicating with the fluid-filled cushion; and
    a fluid control unit communicating with the fluid-filled cushion and including a control algorithm, which is $P_{dyn}(t)=P_{cushion}(t)-P_{stat}$, $P_{stat}$ being a static pressure inside of the fluid-filled cushion, $P_{cushion}(t)$ being a pressure inside of the fluid-filled cushion at time t and measurable by the pressure sensor, $P_{dyn}(t)$ being a pressure inside of the fluid-filled cushion attributable to a change in motion detected by the acceleration sensor,
    wherein the fluid control unit effects a change of fluid pressure within the fluid-filled cushion upon receipt of an input from the pressure sensor and the acceleration sensor according to the control algorithm.

* * * * *